United States Patent
Dotan-Cohen et al.

(10) Patent No.: US 11,546,283 B2
(45) Date of Patent: Jan. 3, 2023

(54) NOTIFICATIONS BASED ON USER INTERACTIONS WITH EMAILS

(71) Applicant: MICROSOFT TECHNOLOGY LICENSING, LLC, Redmond, WA (US)

(72) Inventors: Dikla Dotan-Cohen, Herzliya (IL); Haim Somech, Ramat Gan (IL); Ido Priness, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 666 days.

(21) Appl. No.: 15/199,594

(22) Filed: Jun. 30, 2016

(65) Prior Publication Data

US 2018/0006989 A1  Jan. 4, 2018

(51) Int. Cl.
| | | |
|---|---|---|
| G06F 15/16 | (2006.01) | |
| H04L 51/224 | (2022.01) | |
| G06Q 10/10 | (2012.01) | |
| H04L 67/50 | (2022.01) | |
| H04L 51/04 | (2022.01) | |

(52) U.S. Cl.
CPC ......... *H04L 51/224* (2022.05); *G06Q 10/107* (2013.01); *H04L 51/04* (2013.01); *H04L 67/535* (2022.05)

(58) Field of Classification Search
CPC .......... H04L 51/24; H04L 51/04; H04L 67/22
See application file for complete search history.

(56) References Cited

U.S. PATENT DOCUMENTS

| | | |
|---|---|---|
| 5,245,532 A | 9/1993 | Mourier |
| 6,085,201 A | 7/2000 | Tso |
| 6,434,603 B1 | 8/2002 | Tsuji et al. |
| 7,016,937 B1 | 3/2006 | Malik |
| 7,174,366 B2 | 2/2007 | Chou |
| 7,801,962 B2 | 9/2010 | Jayaweera |
| 7,953,607 B2 | 5/2011 | McNairy |
| 8,250,155 B2 | 8/2012 | Corry et al. |
| 8,527,436 B2 | 9/2013 | Salaka et al. |
| 8,768,308 B2 | 7/2014 | Kim et al. |

(Continued)

OTHER PUBLICATIONS

"It's Time to Seize Control of Email", Retrieved on: Dec. 30, 2015 Available at: http://www.hubspot.com/sales/email-tracking-guide.

(Continued)

*Primary Examiner* — Suraj M Joshi
*Assistant Examiner* — Jaren Means
(74) *Attorney, Agent, or Firm* — Shook, Hardy & Bacon L.L.P.

(57) ABSTRACT

In some implementations, a method includes extracting message attributes of an email associated with a user from the email. User interaction data is identified that is generated by the user in association with display of the email based on sensor data from one or more sensors. It is determined that the user interaction data corresponds to a routine of the user based on a routine-related aspect generated from a user routine model representing the routine. A time to present a notification of the email is determined based on the routine. The notification is provided to the user on a user device based on the determined time to present the notification.

20 Claims, 5 Drawing Sheets

(56) References Cited

U.S. PATENT DOCUMENTS

| | | |
|---|---|---|
| 8,849,918 B2 | 9/2014 | Drouet et al. |
| 2004/0002958 A1* | 1/2004 | Seshadri ............. H04L 12/1859 |
| 2004/0039630 A1* | 2/2004 | Begole ................. G06Q 10/105 |
| | | 705/320 |
| 2005/0188037 A1 | 8/2005 | Hamaguchi |
| 2006/0053204 A1 | 3/2006 | Sundararajan et al. |
| 2009/0037537 A1 | 2/2009 | Callanan et al. |
| 2009/0119600 A1 | 5/2009 | O'Sullivan et al. |
| 2009/0157827 A1 | 6/2009 | Bangalore |
| 2013/0159408 A1* | 6/2013 | Winn ..................... G06N 20/00 |
| | | 709/204 |
| 2015/0195233 A1 | 7/2015 | Ramanathan et al. |
| 2015/0200899 A1* | 7/2015 | Sanketi ................. H04L 51/224 |
| | | 709/206 |
| 2015/0229599 A1 | 8/2015 | Arora et al. |
| 2016/0034424 A1 | 2/2016 | Won |
| 2016/0037481 A1 | 2/2016 | Won et al. |
| 2017/0099592 A1* | 4/2017 | Loeb ................... G06Q 10/107 |

OTHER PUBLICATIONS

"Email Automation", Retrieved on: Dec. 30, 2015 Available at: https://getbase.com/features/email-intelligence/.

"Email Tracking Software", Published on: Sep. 22, 2015 Available at: https://www.agilecrm.com/email-tracking.

"International Search Report and Written Opinion Issued in PCT Application No. PCT/US17/036384", dated Jul. 17, 2017, 13 Pages.

* cited by examiner

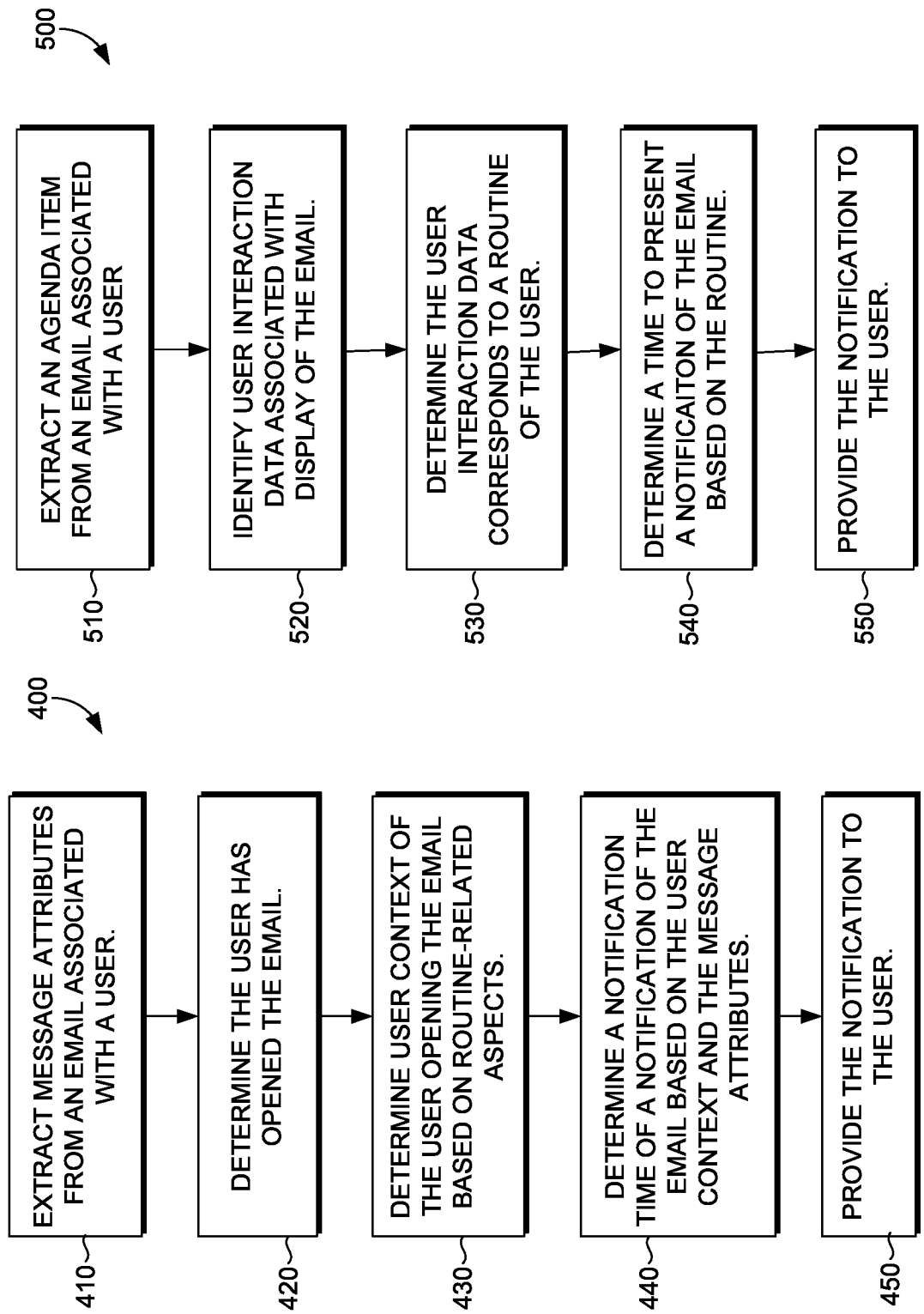

NOTIFICATIONS BASED ON USER INTERACTIONS WITH EMAILS

BACKGROUND

Computer messaging technologies, such as Email or instant messaging, allow computer messages to be exchanged between users. Often, it is desirable for a user to respond to a computer message. For example, an email may include a request that its recipients provide a response to the email, and can specify particular information to include in the response or other criteria to satisfy the request. However, many users have difficultly tracking which emails have been responded to, which emails still need some response to satisfy requests, and prioritizing responses to the emails. For example, a user may have sent many requests out to recipients and some requests may have been satisfied while others remain pending. As another example, the user may have received many requests and only responded to some. Further, in some cases, a request may be partially satisfied, but an additional response is required to fully satisfy the request.

Conventional technologies allow users to manually flag emails to assist in tracking which need a response. However, the user must both manually set and unset these flags, so they are not definitive of whether a request has been satisfied. Furthermore, these flags provide no distinction between partially and fully satisfied requests with respect to a user. Many users rely on whether an email is marked as opened or unopened to determine which emails may need a response. However, often, users open an email without reading its contents or read the email briefly, such as on a mobile phone while driving. These emails are marked as opened while they still may require some action from the user. Thus, the user must search through and read emails to discover emails that require responses, which reduces user efficiency and wastes computing resources. Additionally, users waste storage and bandwidth on follow up messages for missing or incomplete requests.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Implementations of the present disclosure are directed towards systems and methods for providing automatic email notifications to users. In some respects, emails that are sent by a user and received by the user are analyzed and tracked. Message attributes are extracted from the emails such as due dates and semantic characteristics of the emails. Notifications of emails are provided to users regarding the emails. The notifications can be reminders of any of the emails sent and/or received by the user. The determination of whether to provide a notification to a user and/or a time to provide the notification to the user can be based on user context about user interactions with the email, such as routines of the user that are associated with the user interactions, routine-related aspects of routines associated with the user that are associated with the user interactions, message attributes of the email, and/or identified activities of the user that are associated with the user interactions.

BRIEF DESCRIPTION OF THE DRAWINGS

Aspects of the invention are described in detail below with reference to the attached drawing figures, wherein:

FIG. 4 depicts a flow diagram of a method, in accordance with implementations of the invention;

FIG. 5 depicts a flow diagram of a method, in accordance with implementations of the invention.

DETAILED DESCRIPTION

Figure 1:
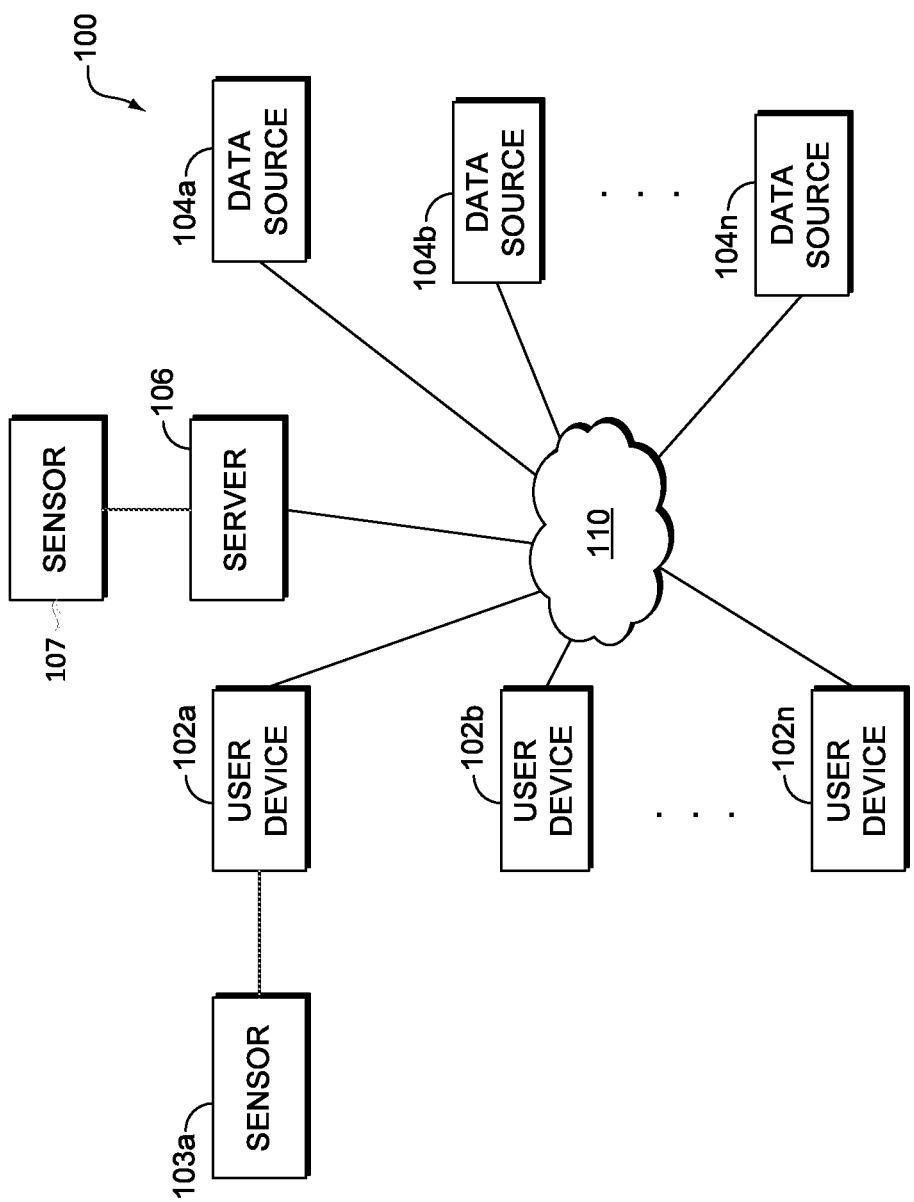
FIG. 1 is a block diagram of an example operating environment suitable for implementing aspects of the invention.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed towards systems, methods, and computer storage media for, among other things, analyzing and tracking emails with respect to users for determining notifications or other actions to take with respect to the emails. In doing so, the systems described herein can leverage inferred aspects related to a specific user's behavior patterns, or routines, using a routine model for the user based, at least in part, on sensor data reflecting user activity as detected by one or more sensors ("interaction data"). As used herein, "user routine models" are probabilistic, machine learning constructs that infer or predict routine-related aspects associated with a specific user's behavior patterns ("routine-related aspects") by evaluating features, attributes, or variables ("routine-related features") according to rules, frameworks, or machine learning algorithms ("routine-related logic") that define logical relationships amongst routine-related features or between routine-related features and routine-related inferences. In some implementations, routine-related logic further defines procedures, processes, or operations used to determine the various metrics, scores, or values associated with routine-related inferences, such as confidence scores, variance metrics, central tendency values, probability distribution functions, and the like.

"Routine-related inferences," as used herein, describe inferences, estimations, or approximations that provide additional insight into the specific user's behavior or behavior patterns, such as with respect to interactions patterns with emails or interactions with emails. As such, routine-related inferences enable identification of one or more routine-related aspects that more closely reflect what the specific user's behavior will likely be at a future time. Routine-related inferences are determined by evaluating (or analyzing) one or more routine-related features derived from data associated with currently-sensed and/or historically-sensed interaction data with user routine models trained using data associated with previously-sensed interaction data. In some implementations, routine-related inferences are used to generate or update routine-related profiles associated with a specific user in order to provide time-sensitive recommendations, or notifications, personalized to the specific user's behavior pattern.

The term "service" is used broadly herein to refer to any suitable application or automation technology which may be implemented as one or more computer applications, services, or routines, such as an app running on a mobile device or the cloud, as further described herein. Similarly, the term "recommendation" is used broadly herein to refer to any recommendations, features, actions, operations, notifications, functions, and/or other utilities provided by services. The term "logic" encompasses any physical and tangible functionality for performing a task. For instance, each operation illustrated in the flowcharts may correspond to a logic component for performing that operation. An operation can be performed using, for instance, software running on computer equipment, hardware (e.g., chip-implemented logic functionality), etc., and/or any combination thereof. When implemented by computing equipment a logic component represents an electrical component that is a physical part of the computing system, however implemented.

Implementations of the present disclosure are directed towards systems and methods for providing automatic email notifications to users. In some respects, emails that are sent by a user and received by the user are analyzed and tracked. Message attributes are extracted from the emails such as explicit or implied due dates and semantic characteristics of the emails. Notifications of emails are provided to users regarding the emails. The notifications can be reminders of any of the emails sent and/or received by the user. The determination of whether to provide a notification to a user and/or a time to provide the notification to the user can be based on user context surrounding user interactions with the email, such as routines of the user that are associated with the user interactions, routine-related aspects of routines associated with the user that are associated with the user interactions, message attributes of the email, and/or identified activities of the user that are associated with the user interactions.

In some respects, the present disclosure provides for significant reductions to utilization of computing resources, such as bandwidth and storage, as well as improvement to user efficiency in interacting with emails presented to users. For example, conventional technologies do not track which emails need a response or provide a distinction between partially and fully satisfied requests with respect to a user. By extracting message attributes from emails and determining whether to notify users of the emails and/or when to notify users of the emails, users need not search through emails for those that still require a response. Furthermore, users need not meticulously flag and un-flag emails to track their response status. Thus, users are able to more accurately identify emails that need responses while reducing the effort exerted by the user with input devices. Additionally, storage and bandwidth are preserved by avoiding follow up messages for missing or incomplete requests. Determining notifications are enhanced by factoring in user context associated with the user opening the emails, so as to further improve user efficiency and reduce computer response consumption.

Turning now to FIG. 1, a block diagram is provided showing an example operating environment 100 in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that operating environment 100 shown in FIG. 1 is an example of one suitable operating environment. Each of the components shown in FIG. 1 may be implemented via any type of computing device, such as computing device 600, described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of being operated by a user. For example, in one implementation, user devices 102a through 102n may be the type of computing device described in relation to FIG. 6 herein. By way of example and not limitation, a user device may be embodied as a personal computer (PC), a laptop computer, a mobile device, a smartphone, a tablet computer, a smart watch, a wearable device, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one implementation, one or more data sources 104a through 104n provide (or make available for access) user data to data collection component 215 of FIG. 2.) At least one of Data sources 104a and 104b through 104n may be discrete from user devices 102a and 102b through 102n and server 106 or may be incorporated and/or integrated into at least one of those components. In one implementation, one or more of data sources 104a though 104n comprises one or more sensors, which may be integrated into or associated with one or more of the user device(s) 102a, 102b, or 102n or server 106. Examples of sensed user data made available by data sources 104a though 104n are described further in connection to data collection component 215 of FIG. 2.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103 and 107, and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of being operated by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, system 200 described in connection to FIG. 2. (For example, in one embodiment, one or more data sources 104a through 104n provide or make available for access user data to data collection component 215 of FIG. 2.), or system 300 described in connection to FIG. 3. Data sources 104a and 104b through 104n may be discrete from user devices 102a and 102b through 102n and server 106 or may be incorporated and/or integrated into at least one of those components. In one embodiment, one or more of data sources 104a though 104n comprise one or more sensors, which may be integrated into or associated with one or more of the user device(s) 102a, 102b, or 102n or server 106. Some examples of such data sources include sensor 103 or 107, described in FIG. 1. Examples of sensed user data made available by data sources 104a though 104n are described further in connection to data collection component 215 of FIG. 2.

Operating environment 100 can be utilized to implement one or more of the components of systems 200 and 300 later described in additional detail. This includes components for collecting user data, monitoring activity events, determining activity patterns, consuming activity pattern information to provide an improved user experience, generating personalized content, and/or presenting notifications and related content to users.

Figure 2:
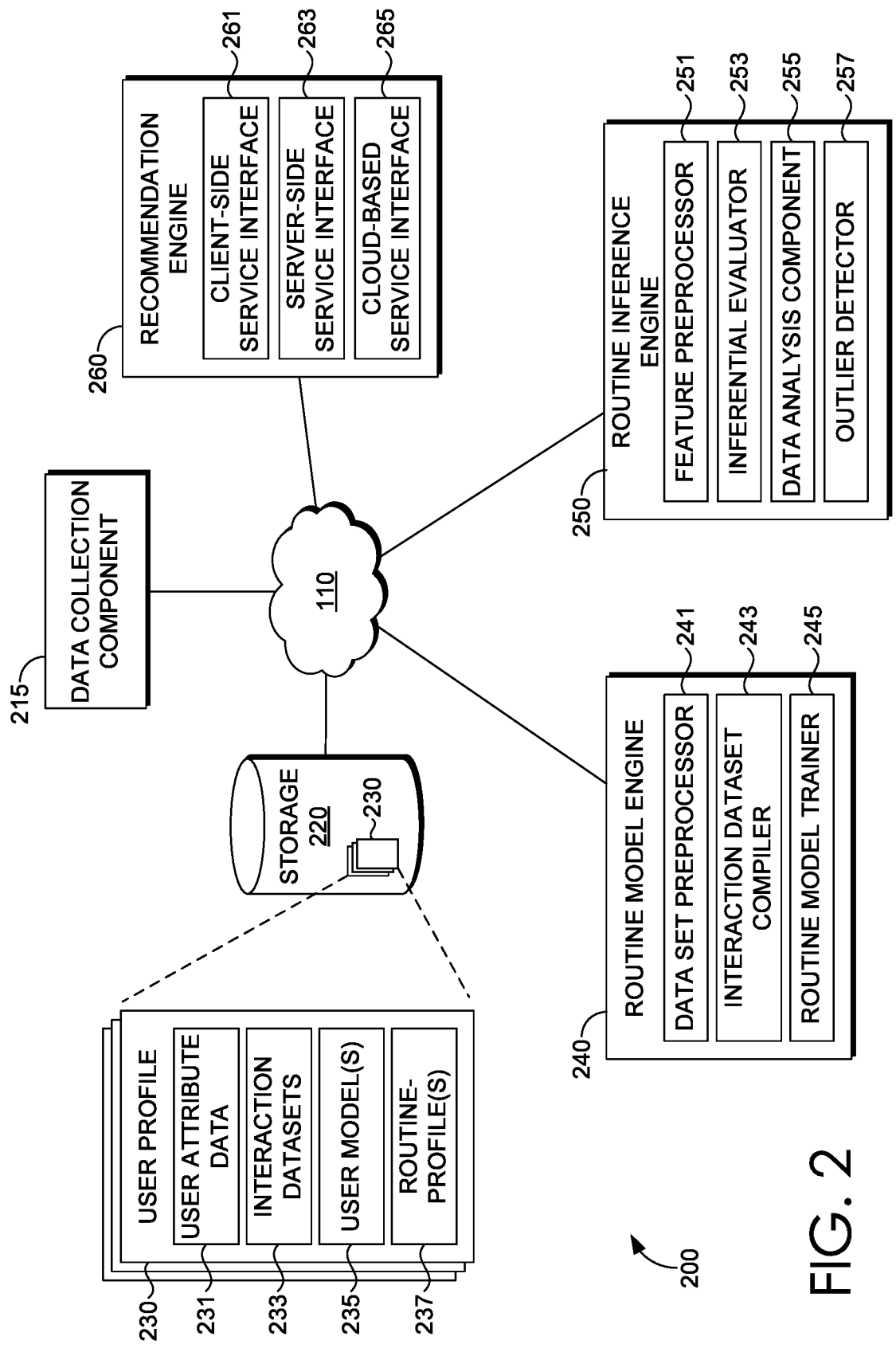
FIG. 2 is a diagram depicting an example system suitable for implementing aspects of the invention.

Operating environment 100 can be utilized in conjunction with the components of the exemplary computing system architecture depicted in FIG. 2 that is suitable for implementing embodiments of the invention and is generally designated as system 200. System 200 represents only one exemplary computing system architecture suitable for implementing aspects of the invention. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. Among other components not shown, system 200 is generally comprised of components for inferring routine-related aspects for a specific user based on interaction data. System 200 includes such components as data collection component 215, storage 220, routine model engine 240, routine inference engine 250, and recommendation engine 260, all of which are communicatively coupled via network 110 or another network.

In some implementations, the functions performed by components of system 200 are associated with one or more personal assistant and/or email applications, services, or routines. In particular, such applications, services, or routines may operate on one or more user devices (such as user device 102a), servers (such as server 106), may be distributed across one or more user devices and servers, or be implemented in the cloud. Moreover, in some implementations these components of system 200 may be distributed across a network, including one or more servers (such as server 106) and client devices (such as user device 102a), in the cloud, or may reside on a user device such as user device 102a. As with operating environment 100, some of the components described herein may be embodied as a set of compiled computer instructions, computer functions, program modules, computer software services, or an arrangement of processes carried out on one or more computer systems, such as computing device FIG. 6 described in connection to FIG. 6.

For example, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the implementations of the invention described herein can be performed, at least in part, by one or more hardware logic components. Exemplary types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some implementations functionality of these components can be shared or distributed across other components.

Data collection component 215 is generally responsible for acquiring, accessing, or receiving (and in some cases also identifying) interaction data from one or more data sources, such as data sources 104a and 104b through 104n of FIG. 1. For example, interaction data may be received from a plurality of user devices (such as user devices 102a and 102b through 102n of FIG. 1) associated with a user or in some instances, associated with multiple users. In this way, user activity of a particular user from multiple user devices used by the user (e.g. the user's mobile phone, laptop, tablet, etc.), may be received as interaction data. In addition, interaction data may be received from a plurality of user accounts, such as social media accounts, email accounts, computer login accounts, and/or computer messaging accounts. Other examples of suitable accounts are described below with respect to user data.

Interaction data may be received, acquired, or accessed, and optionally accumulated, reformatted and/or combined, by data collection component 215 and stored in one or more data stores such as storage 220. For example, interaction data may be stored in or associated with a user profile 230, as described herein. The one or more data stores may thus be available to routine model engine 240, routine inference engine 250, and recommendation engine 260. In some implementations, data collection component 215 is configured to accumulate interaction data reflecting user activity detected by one or more sensors for an individual user ("individual-sourced interaction data"). In some implementations, data collection component 215 is configured to accumulate interaction data associated with user-source interactions for a plurality of users ("crowd-sourced interaction data"). Any personally identifying data (i.e., interaction data that specifically identifies particular users) may either not be uploaded from the one or more data sources with interaction data, not permanently stored, and/or not made available to routine model engine 240, routine inference engine 250, and/or recommendation engine 260.

Interaction data may be received from a variety of sources where the data may be available in a variety of formats. For example, in some implementations, user data accumulated by data collection component 215 is received via one or more sensors associated with user devices (such as user device 102a and/or other devices associated with the user), servers (such as server 106), and/or other computing devices. As used herein, a sensor may include a function, routine, component, device, or combination thereof for sensing, detecting, or otherwise obtaining information such as user data from data sources (e.g., data source 104a of FIG. 1), and may be embodied as hardware, software, or both.

By way of example and not limitation, user data may include data that is sensed or determined from one or more sensors (referred to herein as "sensor data"), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with communication events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as a Microsoft® account, Amazon.com®, eBay®, PayPal®, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

In some respects, user data may be provided in user signals. A user signal can be a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some implementations, data collection component 215 receives or accesses data continuously, periodically, or as needed.

In general, storage 220 is configured to store computer instructions (e.g., software program instructions, routines, or services), and/or models used in implementations of the invention described herein. In some implementations, storage 220 also stores information or data received via the various components of system 200 and provides the various components of system 200 with access to that information or data. For example, storage 220 may store such information or data as interaction data, descriptive information associated with any of the user data described with respect to data collection component 215, interaction data, inferential data, interaction datasets, crowd-sourced datasets, individual-sourced datasets, user routine models, routine-related inferences, routine-related profiles, and one or more user profiles (e.g. user profiles 230). In an implementation, storage 220 comprises a data store (or computer data memory). Further, although depicted as a single data store component, storage 220 may be embodied as one or more data stores or may be in the cloud.

Exemplary user profile 230 includes information associated with a specific user, or in some implementations, a group or category of users. As shown in FIG. 2, user profiles 230 include such information as: user attribute data 231, interaction datasets 233, user routine models 235, and routine-related profiles 237. The information stored in user profiles 230 may be available to the other components of exemplary system 200.

User attribute data 231 comprises any characteristic, trait, or attribute associated with a specific user. In some implementations, user attribute data 231 includes information relating to demographic data, location data, occupational data, educational data, and the like. For example, demographic data includes such information as age, gender, nationality, religious affiliations, ethnicities, and the like. As another example, location data includes such information for the specific user as: current physical location, work location, home location, projected future location(s), and the like. In some implementations, similar location data may be available for one or more user devices or one or more individuals associated with the specific user (e.g. friends, family, etc.). User attribute data 231 may be acquired from users in a variety of ways. In some implementations, user attribute data 231 is submitted by users to system 200 (e.g., explicitly) via any of the input devices described below with respect to computing device 600 of FIG. 6. In some implementations, user attribute data 231 is compiled from user data submitted by users as part of registering for user profiles with applications; social media profile building; census registration; and the like. In some implementations, user attribute data 231 is acquired from one or more reports associated with users, such as credit reports; background reports; employment reports; and the like. In some cases, at least some of user attribute data 231 is inferred, for example, based on routine-related inferences described in additional detail below. These attributes may be referred to as routine-related aspects, or routine-related attributes.

Interaction dataset 233 broadly pertains to any dataset populated using any data associated with previously-sensed interaction data that is used to train, test, and/or validate user routine models 235. A user routine model 235 may be a machine-learned, probabilistic inference model configured to determine routine-related inferences by evaluating data associated with currently-sensed and/or historically-sensed interaction data, in some implementations. Routine-related profile 237 may include information regarding one or more routine-related aspects for a specific user. Routine-related profile 237 may be initialized and/or updated using routine-related inferences determined by evaluating currently-sensed and/or historically-sensed interaction data using user routine model 235. By way of example, for a routine related to checking email, routine-related aspects, could include one or more of the following aspects of a specific user's email checking pattern: frequencies of checking email, times or time ranges of checking email, durations of checking email, frequency of responding to emails, frequent senders of emails, and the like. Routine-related aspects of routine-related profile 237 may be represented according to any known probabilistic machine learning model output. For example, routine-related aspects may be represented as a statistical distribution describing a particular aspect in terms of a central tendency metric (e.g. a mean, a median, or a mode) and a variance metric (e.g. a range, a standard deviation, or a variance). Further details regarding interaction datasets 233, user routine models 235, and routine-related profiles 237 are described below with respect to routine model engine 240.

Routine model engine 240 is generally adapted to populate interaction datasets 233 in cooperation with storage 220 and train user routine models 235 using those interaction datasets 233. User routine models 235 trained by routine model engine 240 enable routine inference engine 250 to infer (or predict) routine-related aspects for a specific user as well as various attributes of the user or data associated with the user, such as emails. As shown in exemplary system 200, routine model engine 240 includes dataset preprocessor 241, interaction dataset compiler 243, and routine model trainer 245.

Dataset preprocessor 241 may be configured to create user-attribute filters using user attribute data 231, in implementations where crowd-sourced datasets are used to populate interaction datasets 233. In these implementations, user routine models 235 may, in a sense, be pre-tailored for a specific user through selecting previously-sensed interaction data that is more relevant to the specific user for use in training user routine models. Dataset preprocessor 241 enables such pre-tailoring of user routine models 235 by applying at least one user attribute filter to crowd-sourced datasets prior to populating interaction datasets 233 with their associated previously-sensed interaction data. In some implementations, user attribute filters are based on data acquired from user attribute data 231 associated with user profiles 230. In some implementations, user attribute filters may be based on data acquired from users via any of the input devices described below with respect to computing device 600 of FIG. 6.

For example, a user-location filter may be applied to crowd-sourced datasets to exclude previously-sensed interaction data associated with users outside of a pre-determined distance range from a specific user. As another example, a user-demographic filter may be applied to crowd-sourced datasets to only include previously-sensed interaction data associated with users having at least one demographic characteristic in common with a specific user (e.g. age, income, cultural identity, gender, etc.). In another example, a user-occupation filter is applied to crowd-sourced data sets to only include previously-sensed interaction data associated with users having at least one occupational characteristic in common with a specific user (e.g. job title, industry, level of experience, etc.).

Interaction dataset compiler 243 is configured to populate, compile, or build interaction datasets 233 with previously-sensed interaction data received from data collection component 215, storage 220, and/or routine inference engine 250. In some implementations, interaction dataset 233 is populated with individual-sourced data reflecting a specific user's activity as detected by one or more sensors. In some implementations, interaction dataset 233 is populated with crowd-sourced interaction data reflecting the activity of multiple users as detected by one or more sensors. In some implementations, interaction dataset 233 is populated with descriptive data associated with previously-sensed interaction data, such as time/date stamps, metadata tags, geographical location data, etc. In some implementations, interaction dataset is populated with contextual data as discussed in more detail below with respect to inferential evaluator 253.

Implementations, routine model trainer 245 may be configured to train user routine models (e.g., User routine model 235) through analyzing interaction datasets 233 to identify routine-related features, routine-related aspects, routine-related logic, and in some implementations routine-related weights. As discussed above, in some implementations, user routine model 235 comprises a machine-learned, probabilistic inference model configured to determine routine-related inferences by evaluating data associated with currently-sensed interaction data. As such, User routine model 235 may be trained by any known machine learning technique.

Routine-related features may be identified by routine model trainer 245 based on any combination of user data described in connection to data collection component 215, descriptive information associated with such user data, and contextual data provided by inferential evaluator 253. In some implementations, routine-related features are identified by routine model trainer 245 recognizing patterns between data within interaction dataset 233 and a specific user's routine. For example, routine model trainer 245 may use a pre-determined statistical threshold, such as a correlation threshold (either positive or negative), to recognize such patterns. Pre-determined statistical thresholds may reflect relationships among identified routine-related features or between routine-related features and various aspects of the specific user's routine.

In some implementations, routine-related features utilize user signals providing a feed of interaction data from data sources (e.g. a user device) associated with a user. In these implementations, feeds of interaction data may be provided at any level of granularity including: continuously, periodically (e.g. every minute, 5 minutes, hour, 2 hours, etc.), or upon the user signal transitioning logic states (e.g. off to on, high to low, etc.). User signals providing a feed of interaction data may be received from sensors associated with applications or devices on a client-side, on a server-side, in the cloud, or any combination thereof.

Routine model trainer 245 is further configured to determine routine-related logic for user routine models that maps data associated with interaction data to routine-related features and defines logical relationships amongst routine-related features and/or between routine-related features and routine-related inferences. In some implementations, routine-related logic further define procedures, processes, or operations used to determine the various metrics, scores, or values associated with routine-related inferences, such as confidence scores, variance metrics, central tendency values, probability distribution functions, and the like.

In some implementations, confidence scores are employed to quantify a degree of confidence in how accurately one or more routine-related aspects associated with a routine-related profile reflect the user's routine. In these implementations, confidence scores may be associated with the routine-related profile overall, particular routine-related aspects of the routine-related profile, and/or one or more metrics (e.g. variance metric, central tendency metric, etc.) associated with particular routine-related aspects of the routine-related profile. Stated differently, a confidence score is an associated probability or confidence that indicates a likelihood of a predicted routine-related aspect coinciding with a user's actual routine. In some implementations, services use the confidence score in various ways, such as for a threshold in providing time-sensitive recommendations to a user.

Routine model trainer 245 may be further configured to assign at least one routine-related weight for the routine-related features in implementations where routine-related weights are used. Routine-related weights may be determined by analyzing interaction datasets 233 used to train user routine models 235. Routine-related weights reflect a corresponding routine-related feature's relative statistical significance in determining (predicting the likelihood of) a routine-related inference. Such routine-related weights may be assigned by routine model trainer 245 to one or more routine-related features associated with user routine models.

Although FIG. 2 depicts routine model engine 240 as a separate component, those skilled in the art will recognize that routine model engine 240, or any sub-component thereof, may be integrated with another component, such as an interaction data collection component, an analysis tool, a user device, a web server, or the like. In some implementations, routine model engine 240 is implemented as part of routine inference engine 250 or other components similarly designed to generate routine-related profiles. In some implementations, routine model engine 240 is implemented as part of a web server, a hybrid hardware/software component, or as a software module running on a conventional personal computer that is being used to infer routine-related aspects of user sleep patterns using interaction data.

Routine inference engine 250, in general, is configured to infer routine-related aspects by analyzing currently-sensed interaction data with user routine models trained using previously-sensed interaction data. As shown in exemplary system 200, routine inference engine 250 includes feature preprocessor 251, inferential evaluator 253, data analysis component 255, and outlier detector 257.

Feature preprocessor 251 is configured to map data associated with interaction data to generate routine-related features for analysis by data analysis component 255, as identified by routine model trainer 245. Routine-related features generated by feature preprocessor 251 may include any of the data associated with interaction data discussed herein. In some implementations, feature preprocessor 251 is further configured to convert data associated with interaction data into appropriate formats for mapping to routine-related features, as specified by routine model trainer 245.

For example, data associated with interaction data may be received as analog data or digital data provided as any number of data types including: matrices; vectors; and scalars. In this example, feature preprocessor 251 converts such data into an appropriate format for corresponding routine-related features to be usable by data analysis component 255.

In some implementations, feature preprocessor 251 may map data associated with currently-sensed interaction data from a single data source to a single routine-related feature. For example, feature preprocessor 251 may map currently-sensed and/or historically-sensed interaction data from an email application running on a specific user's smart phone or other device to a single routine-related feature. As examples, routine model trainer 245 uses the interaction data to determine the specific user regularly checks email on the specific device, or any device, in the morning.

In some implementations, feature preprocessor 251 may map data associated with currently-sensed interaction data from a plurality of data sources to a single routine-related feature. For example, feature preprocessor 251 may map currently-sensed interaction data from a website hosted by a remote server with which a specific user is interacting and a user device the specific user is using to interact with the website to a single-related feature. In this example, the descriptive data may be in the form of a device identifier associated with interaction data received from a user device. Routine model trainer 245 could determine, in this example, that the specific user visits an email provider website on a tablet computing device prior to bedtime. Interaction data collected from the same email provider website may not be used to infer the specific user's bedtime routine if the specific user interacts with the email provider website on a smart phone while getting ready for work in the morning.

Inferential evaluator 253 may be configured to extract contextual data from sensed interaction data and provide the extracted contextual data to storage 220 for use by other components of system 200. Contextual data, in general, can correspond to any information providing context to any interaction data utilized by system 200 by describing circumstances surrounding users, devices, and/or applications when interaction data is acquired. Contextual data can provide background information for sensed interaction data that enables system 200 to identify more patterns within interaction datasets 233 than would otherwise possible if system 200 was unaware of the surrounding circumstances.

Examples of contextual data include: tasks being performed at the time, such as military reserve training, trying to lose weight resulting in users waking up earlier to jog; information regarding temporal significance such as birthdays, holidays, anniversaries, seasons of the year, special events, vacations, associations between recent events; information regarding geographical significance, such as work place/home locations, changes in location (e.g. moving from one city to another city or one time zone to another time zone), vacation destinations; or any other information that provides system with a higher level of understanding about circumstances surrounding sensed interaction data.

Data analysis component 255 is generally configured to implement routine-related logic provided by routine model engine 240 in user routine models on routine-related features comprised of data associated with interaction data from feature preprocessor 251. By implementing routine-related logic on routine-related features, data analysis component 255 is able to determine routine-related inferences and the various metrics, scores, or statistical information associated with routine-related inferences, such as confidence scores, variance metrics, central tendency values, probability distribution functions, and the like. In cooperation with storage 220, data analysis component 255 may be further configured to update (or initialize) routine-related profiles associated with the specific user using routine-related inferences and the various metrics, scores, or statistical information associated with routine-related inferences determined from currently-sensed interaction data.

Outlier detector 257 may be configured to identify routine-related inferences deviating from previously determined routine-related inferences enough to constitute a statistical outlier ("outlier inferences") using a pre-determined cutoff. For example, the pre-determined cutoff may be established according to known statistical anomaly detection methods, such as: Fuzzy Logic based outlier detection; Cluster Analysis based outlier detection; Density-based techniques, or any other known statistical anomaly detection metric. In some implementations, outlier detector 257 compares routine-related inferences with previously determined routine-related inferences associated with particular routine-related profiles using a pre-determined cutoff.

In some implementations, data associated with routine-related inferences are identified as statistical outliers by outlier detector 257 and are stored in interaction datasets referred to herein as "outlier datasets." Such data, for example, may include the determined routine-related inference, any routine-related features used to determine that routine-related inference, or any currently-sensed interaction data acquired within a specified time of determining that routine-related inference. In some implementations, outlier datasets are used to train user routine models according to any of the implementations disclosed herein. In these implementations, outlier datasets may be used instead of and to replace a portion of and/or be merged with interaction datasets in training user routine models that are referred to herein as "alternative user routine models." In some implementations, routine-related inferences determined using alternative user routine models are used to generate routine related profiles (referred to herein as "alternative routine-related profiles"). In these implementations, alternative routine-related profiles may be identified using alternative profile labels based on some commonality within datasets used to train their respective alternative user routine model, as determined by routine model engine 240.

For example, if routine model engine 240 determines that an outlier dataset used to train an alternative user routine model is comprised of interaction data associated with a particular geographic location (e.g. Israel, Europe, a vacation home in Mexico, etc.). In this example, an alternative routine-related profile generated using routine-related inferences determined using this alternative user routine model may be identified using an alternative profile label designating the particular geographic location. Accordingly, the alternative routine-related profile of this example may comprise routine-related aspects for the specific user that are specific to that particular geographic location. For example, the specific user may check email in the morning when vacationing in Mexico compared to at night when they are home working.

As another example, a routine model engine 240 determines that an outlier dataset used to train an alternative user routine model is comprised of interaction data associated with a particular period of time (e.g. weekdays/weekends, summer/winter, specific weekends every month, etc.). In this example, an alternative routine-related profile generated using routine-related inferences determined using this alternative user routine model may be identified using an alternative profile label designating the particular period of time. Accordingly, the alternative routine-related profile of this example may comprise routine-related aspects for the specific user that are specific to that particular period of time. For example, the specific user may be in a military reserve unit, which results in the specific user checking email earlier on specific weekends of the month they are training with the military reserve unit versus when they are at home relaxing on the weekend.

Recommendation engine 260 is configured to receive requests for user attribute data, such as routine-related aspects for a specific user, identify the requested user attribute data, optionally using routine-related profiles associated with the specific user, and provide the identified user attribute data to an application, service, or device submitting the request. In some implementations, recommendation engine 260 may be implemented as an application programming interface ("API"). As shown in FIG. 2, recommendation engine 260 is comprised of client-side service interface 261, server-side service interface 263, and/or cloud-based service interface 265.

Client-side service interface 261 is configured to receive requests from client-side recommendation applications or services that directly provide time-sensitive recommendations to a specific user. As an example, received requests could originate from an application running on the specific user's smart phone, such as a personal assistant application, a communication application, or an email application. In another example, a request could originate from a controller communicatively coupled to an actuator associated with any client-side device, machine, or appliance having automation capabilities used by the specific user.

Server-side service interface 263 is configured to receive requests from server-side applications or services that may be hosted on $3^{rd}$ party devices that provide recommendations to users. For example, the received request could originate from a server hosting a website offering commercial or informational services related to social media, traffic, weather, news, and the like. In some implementations, requests could be received from a recommendation engine associated with a routine inference engine in association with another user (e.g., the specific user's family members, friends, etc.). Similarly, cloud-based service interface 265 is configured to receive requests from any cloud-based applications or services.

A routine-related prediction or inference of a routine-related aspect for a specific user may optionally be determined using currently-sensed and/or historically-sensed interaction data and one or more user routine models trained using previously-sensed interaction data. An interaction dataset may be populated using previously-sensed interaction data. Previously-sensed interaction data can be received from an interaction data collection component (e.g., data collection component 215 of FIG. 2) prior to being accumulated in stored datasets. In some cases, previously-sensed interaction data is retrieved from stored datasets that include any of the interaction data described with respect to data collection component 215. For example, stored datasets may include accumulated previously-sensed interaction data associated with a specific user from an individual dataset. In another example, stored datasets may include accumulated previously-sensed interaction data associated with a plurality of users from a crowd-sourced dataset. In another example, stored datasets may include accumulated previously-sensed interaction data from an individual dataset, a crowd-sourced dataset, or a combination thereof.

In implementations using crowd-sourced datasets, pre-processing may be performed on previously-sensed interaction data retrieved from crowd-sourced datasets prior to populating interaction datasets. Such pre-processing may include noise filtering, removal of outlier data, and/or treatment of missing data. In implementations with crowd-soured datasets, pre-processing may include filtering previously-sensed interaction data from crowd-soured datasets using one or more filters based on user attributes (e.g., user attribute data 231 of FIG. 2). When used, the one or more filters segregate previously-sensed interaction data received from users with the user attributes from previously-sensed interaction data received from users without the user attributes. Consequently, filtered previously-sensed interaction data may be either included or excluded from the interaction dataset to provide previously-sensed interaction data that is generally tailored for training, testing, and/or validating user routine models.

The user routine model may be trained, tested, and/or validated using populated interaction datasets. As discussed above, user routine models are trained using any known machine learning technique by identifying one or more routine-related features in the interaction dataset. In some implementations, routine-related profiles for the specific user are generated by populating the routine-related profiles with initial values determined using previously-sensed interaction data in populated interaction datasets. In these implementations, confidence scores associated with such routine-related profiles are assigned a minimal value (e.g. zero, 1%, 0.02, etc.). For example, a routine-related profile for the specific user may be generated by populating the routine-related profile with initial values for routine-related aspects. Alternatively, the initial values for routine-related aspects in this example may be assigned confidence scores using any numbering system or combinations thereof.

User routine models include routine-related logic that defines a logical framework for determining routine-related inferences through evaluation of data associated with currently-sensed interaction data. In some implementations, routine-related logic includes one or more of the following probabilistic rule types: prediction rules, ranking rules, clustering rules, or classifying rules. Routine-related logic defines the logical framework by: mapping data associated with currently-sensed interaction data to each of the one or more routine-related features; prescribing relationships between the one or more routine-related features to determine routine-related inferences using data associated with currently-sensed interaction data; and, in some implementations, assigning routine-related weights to at least one routine-related feature. Routine-related weights are assigned to particular routine-related features based on a particular routine-feature's relative significance in determining (e.g. predicting the likelihood of) a routine-related inference. As such, user routine models and their determined routine-related inferences may be used to generate or update routine-related profiles for a specific user.

Currently-sensed interaction data can be received via one or more sensors associated with user devices and a routine-related inference can be determined through evaluation of data associated with that currently-sensed interaction data according to routine-related logic associated with the user routine model. In implementations, data associated with that currently-sensed interaction data includes one or more of the following: raw interaction data received from sensors, descriptive information associated with the raw interaction data, inference data determined from raw interaction data and/or descriptive information, or any combination thereof.

As discussed in connection with routine inference engine 250 of FIG. 2, in implementations, routine-related inferences may be presented in various formats depending on type of routine-related logic used to determine a particular routine-related inference, such as classification labels, probability distribution functions, expected outcomes, outcome scores, and the like.

A routine-related profile for a specific user can be updated or initialized using the routine-related inference. In implementations where routine-related profile(s) have not been generated with initial values, routine-related inferences may be used as initial values to initialize the routine-related profile(s). In implementations where routine-related profiles are generated by populating the routine-related profile(s) with initial values determined using previously-sensed interaction data in populated interaction datasets, routine-related inferences may be reconciled with corresponding initial values. In these implementations, routine-related inferences are reconciled with corresponding initial values through replacement, averaging, weighted averaging, interpolation, extrapolation, and the like. In these implementations where confidence scores are assigned, confidence scores may be increased from previous values according to any of the implementations described herein.

One or more routine-related aspects may be provided for a specific user where a request is received for the one or more routine-related aspects for the specific user. The one or more routine-related aspects can be identified using routine-related profiles associated with the specific user, in response to receiving the request. The routine-related profiles being generated using interaction data according to any of the implementations described herein, such as described above. Further details of generating routine-related profiles are provided in connection with routine inference engine 250 of FIG. 2. The one or more routine-related aspects can be provided to the device, application, or service submitting the request.

Automated Email Tracking and Notification System

Figure 3:
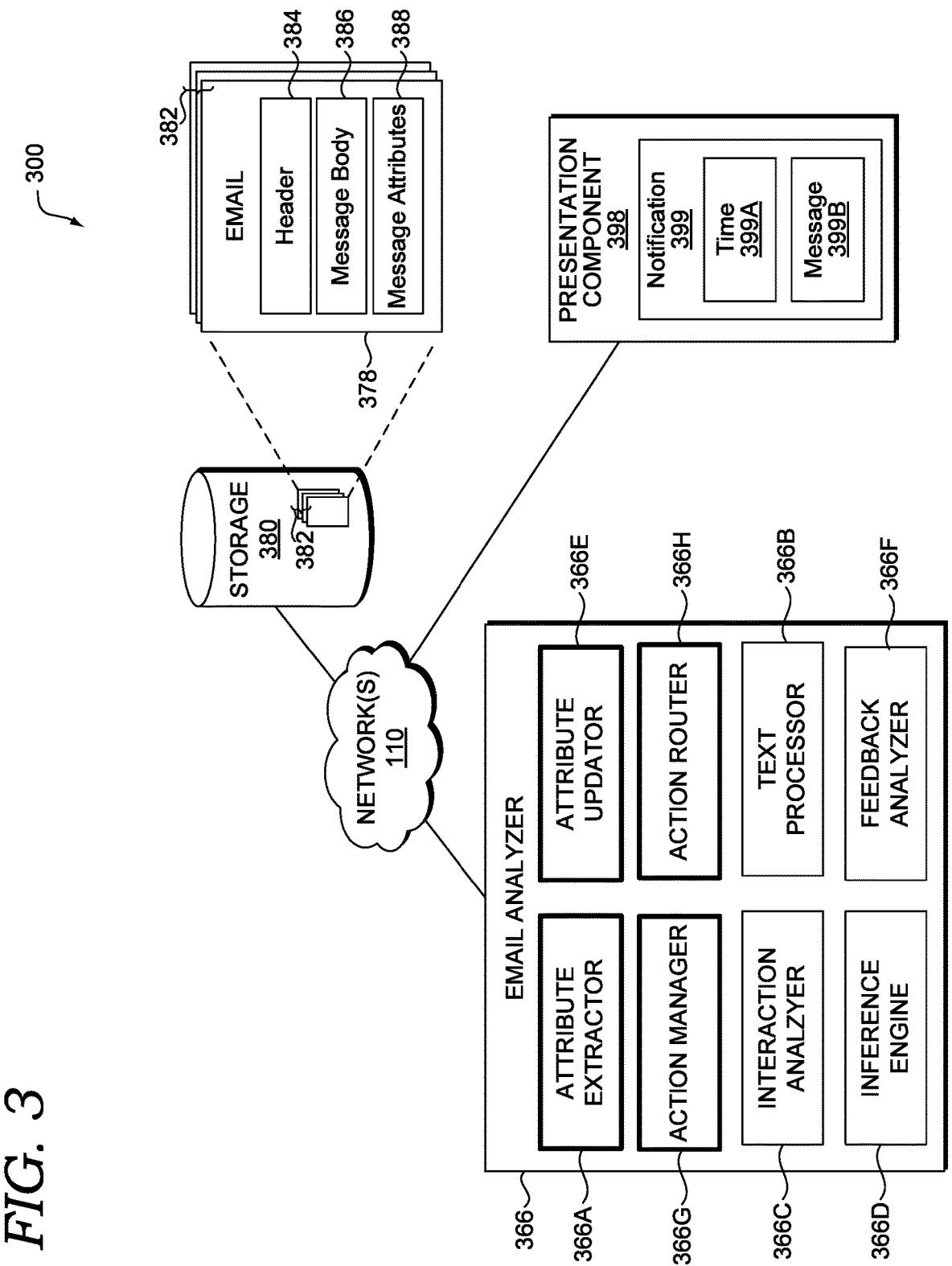
FIG. 3 is a diagram depicting an example system suitable for implementing aspects of the invention.

Having described an optional system and various methods for generating routine-related aspects of routines of users and/or querying user attribute data, in accordance with some implementations of the present disclosure, FIG. 3 is a diagram depicting an exemplary system 300 for tracking emails of users, in accordance with implementations of the present disclosure. In some cases, system 300 and system 200 are subsystems of the same system. In other cases, the system comprises system 300 along with an alternative to or variation of system 200.

By way of example, system 300 includes email analyzer 366, one or more emails, such as emails 382, network 110 or a different network, storage 380, which in some implementations corresponds to storage 220 of FIG. 2, and presentation component 398. It is noted that while the present disclosure while describes emails by way of example, the disclosure should be interpreted as being directed to, when applicable, user generated computer messages in general, and not only emails. Thus, the description can apply to text messages, phone calls, voice messages, device messages, instant messages, or other types of user generated computer messages.

As an overview, email analyzer 366 is configured to analyze and track emails that are sent by a user and received by a user. In doing so, email analyzer 366 can leverage routine-related aspects of the user, which may be determined in conjunction with one or more instances of system 200 of FIG. 2, as described above and/or other routine tracking and analyzing system. The analysis can include extracting message attributes (e.g., message attributes 388) from emails and/or data associated with the emails using attribute extractor 366A.

Email analyzer 366 can utilize the message attributes along with other data associated with the user to determine one or more actions to take on the user's emails. This can include determining which action to take for an email (e.g., provide a notification, forward the email to a user associated with the user, etc.), such as by selecting the action from a group of predetermined actions, and/or determining at least one parameter of the action, such as a message to provide to the user in the action (e.g., notification), a time to present a notification corresponding to the action, or whether to present a notification corresponding to the action. Each of these determinations can utilize a dedicated machine learning model that makes the determinations based on features provided to the model, or any combination of these determinations can be combined into a single machine learning model.

Action manager 366G generates and updates the actions, such as notifications to parties about sent or received emails, even where or because one or more particular users has already opened and/or read the emails. Action router 366H provides the generated actions to presentation component 398 for display to the designated parties or users which may be determined by action manager 366G. Notification 399 is one such example of a notification. Typically the notifications specify, identify, or describe, the one or more emails the notifications are about, as will later be described in further detail.

The actions may include providing a notification to the user and/or at least one other user regarding an email. Action router 366H works in conjunction with presentation component 398 to present and display notifications provided by email analyzer 366 to users. A notification can be provided to the user passively or actively and can comprise the email the notification is regarding, a link to the email, an identifier of the email, a new email generated for the notification, a text message, a computer generated message, push notification, a pop-up notification, and the like.

Another example of a notification is a flag state or state indicator. For example, action router 366H could set a state of an email based on a detected status of the email. The flag state indicator could correspond to and indicate to the user the state of the email, amongst a plurality of potential states that action router 366H can set. Examples of states are those based on the analysis of agenda items, such as completion criteria of those agenda items, due date of those agenda items, and the like. Another example is whether the user read the email. Whether the user has read the email may be inferred as described elsewhere herein, and the system can determine that an opened email was not read, or not sufficiently read or otherwise addressed by the user. An example of a state indicator is a colored icon, where different states are represented by different icons. Another example of a state indicator is a status message, where different states are represented by different status messages that may be generated from templates (e.g., "This message has not been responded to," "You last opened this message on Jun. 28, 2016," "You have an outstanding response for this message" etc.). The state indicators can be presented in association with the emails, such as in a message center of an email application that lists a user's emails and allows access to individual emails from the list. A state indicator could be presented in-line with its corresponding email or emails. It is noted that a single email could have multiple notifications and they may be presented to the user concurrently and/or at different times.

An example of a notification is a reminder of an email sent by the user or received by the user (i.e., a reminder notification). In some cases, the notification is based on whether the email has been responded to, either by the user or at least one other user. In some cases, the notification corresponds to automatically forwarding or suggesting forwarding of the email to at least one other user. In some respects the notification can be based on the user opening and/or reading the email, or at least one email associated with the email, and context surrounding the opening and/or reading of the email or at least one email associated with the email. Thus, a single notification may be based on many user interactions with or associated with at least one email over an extended period of time. Further, the notification may be updated based on these interactions using attribute updater 366E and/or feedback analyzer 366F.

Also, notifications can be based on user interactions associated with emails from any number of users associated with the emails. Thus, at least some of the user interactions described herein could be by a different user than the user that receives the notification. Furthermore, at least one of those users may not be a sender or recipient of email the notification concerns. As examples, the system may identify the user from text of the message body and/or an attachment to the email, based on another user (e.g., a send or recipient of the email) forwarding the email to the user, or otherwise based on the user being associated with another user (e.g., a known assistant, coworker, boss, etc.). The user could be identified in an organizational chart as being associated with the other user. Further at least some of the user interactions can be with emails associated with the email the notification is about. This can include emails that are part of the same thread as the email, forwarded versions of the email, and/or emails that reference the email (whether an email references another email could be inferred based on an analysis of the text of the message body and/or attachments of one or both emails).

As shown, emails 382 each comprise a header, a message body, and attributes of the email. For example, email 378 includes header 384, message body 386, and message attributes 388. Any combination of this information may be embedded within the corresponding email and/or stored in associated with the corresponding email. The header comprises header information corresponding to header fields of the email. The header information can comprise, for example, any information specified for header fields under a standard messaging format protocol, such as a Request for Comments (RFC) standard from the Internet Engineering Task Force (IETF) or the Internet Society (ISOC). As one example, the header fields can be any of those specified by RFC 5322. Examples of header fields include trace, resent-date, resent-from, resent-sender, resent-to, resent-cc, resent-bcc, resent-msg-id, orig-date, from, sender, reply-to, to, cc, bcc, message-id, in-reply-to, references, subject, comments, keywords, and the like. Where another messaging type is employed, such as a text message, different standards may be applicable.

The message body comprises the message provided and/or generated by a user in drafting the email, such as message attachments or information within message attachments, message text, message images, message audio, and the like. The message body can comprise information typed in by the user, dragged and dropped in by the user, attached by the user, or otherwise included based on user interactions by the user while drafting the email.

The message attributes, such as message attributes 388, comprise one or more attributes of the email, or computer message, that are extracted based on the email, such as information extracted from the email, and/or context surrounding the email, including context surrounding the sending and/or receiving of the email and/or emails associated with the email, such as those belonging to a common email thread or conversation. The message attributes can be extracted by email analyzer 366, as will later be described in additional detail. Generally, message attributes correspond to semantic characteristics of emails that are in a format usable by email analyzer 366 to determine one or more actions regarding the emails, such as to provide and/or generate notifications to or for users.

Email analyzer 366 can employ a data collection component, such as data collection component 215 of FIG. 2, in order provide the information utilized to make any needed determinations and/or analysis related to emails of users. To this effect, email analyzer 366 includes text processor 366B, interaction analyzer 366C, and feedback analyzer 366F, which can correspond to subcomponents of data collection component 215 or can supplement data collection component 215. Email analyzer 366 can also employ a routine model engine and routine inference engine in order to facilitate determinations, analysis, and inferences based on routines of users, routine-related aspects of users, routine-related inferences, or other information derived from routines of users. To this effect, email analyzer 366 includes inference engine 366D which can employ or incorporate routine model engine 240, routine inference engine 250 of FIG. 2, and/or any of the various machine learning models described herein. Thus, inference engine 366D is capable of not only inferring routine-related aspects of users, such as those related to emails, but also leveraging routine-related inferences to make inferences and determinations using inferred information. Thus, when the present disclosure describes inferences made with respect to system 300, in one approach, inference engine 366D can base those inferences on routine-related aspects of routines of users.

Text processor 366B is configured to analyze the text of emails, such as any of the text from various parts of the computer messages including the message body of the emails and the header of the emails. Text processor 366B is capable of performing any combination of structured, semi-structured, and structured information extraction on the text of the emails. In performing unstructured extraction, for example, text processor 366B can utilize natural language processing in order to interpret the text with respect to the email. The extracted information can be mapped to message attributes and/or used to interpret user interactions (e.g., be mapped to features of machine learning models).

Interaction analyzer 366C is configured to analyze user interactions with respect to one or more particular emails. The user interactions can be utilized to generate features of any of the various machine learning models described herein. Examples of user interactions that can be detected by interaction analyzer 366C include the user opening an email, the user reading an email, the user scrolling through the email, the user saving a draft of an email, the user sending a response to another email related to the email, opening an email in the same thread or conversation as the email, the user performing some action on a designated device or device type, such as a mobile device, mobile phone, desktop, or other device specified with respect to user devices 10, the user setting or removing a flag, category, or other metadata associated with the email or a related email, and the user performing any of the delineated actions with an email associated with the email. In some implementations, interaction analyzer 366C is capable of detecting user interactions cross device in association with respect to particular users. Thus, interaction analyzer 366C can be used to detect that a user is reading their email at home on a home PC, and that the user later opened, but did not read their email at work on a work laptop.

Feedback analyzer 366F is configured to analyze feedback from users, with respect to one or more particular emails. The user feedback can be utilized to generate features of any of the various machine learning models described herein. In some cases, feedback analyzer 366F extracts feedback data from user interaction data provided by interaction analyzer 366C. The feedback data can be based on feedback provided by the user in response to one or more actions generated by action manager 366G. In some cases, the feedback data is provided to inference engine 366D, which uses the feedback data to update routine models corresponding to action generation for the user. Examples of user feedback include detecting performance of or failure of performance of a predetermined user action after, in response to, or based on a notification presented for an email, such as the user responding to the email. Other examples include user responses to questions or prompts presented to the user regarding notification preferences, at least one particular notification, user configurations or settings made to or updated for notifications, and the like.

At least some user feedback detected by feedback analyzer 366F can be explicit from the user. Other user feedback data detected by feedback analyzer 366F can be inferred from user interactions or information generated based on user interactions, such as information made available from text processor 366B. As an example, user feedback could be inferred from analyzing text of the email or an email associated with the email. In some cases, feedback analyzer 366F determines that an email corresponds to a response to the email based on an analysis of the text.

Action manager 366G generates actions, such as notifications to parties about sent or received emails, even where or because one or more particular users has already opened and/or read the emails. In some cases, whether and/or a number of times the user has read or opened an email corresponds to a feature in any of the various machine learning models described herein. Action router 366H provides the generated actions to presentation component 398 for display to the designated parties or users. Notification 399 is one such example of a notification. Typically the notifications specify, identify, or describe, the one or more emails the notifications are about, such as a message portion of the notification. Message 399B is an example of a message portion generated by action manager 366G for notification 399. Notifications may be generated base action manager 366G for emails from any combination of accounts associated with the user (e.g., a single notification could be for an email from one email account and an email from another email account). Also, the generation can be based on interferences made based on user interactions with emails that are tracked across multiple accounts associated with the user (e.g., any of the exemplary user accounts described herein).

In various implementations, action manager 366G generates notifications to a user about received emails of the user, even where or because the user has already opened and/or read the emails. As examples, Action manager 366G can base notifications for an email on any combination of determining whether the user has responded to the email, determining when the user should respond to the email, and determining when the user should be notified to respond to the email. In some cases, action manager 366G determines a notification time for the email and provides the notification to the user at or based on the notification time. For example, action manager 366G has assigned notification time 399A to notification 399.

In addition to or instead of the notifications being about received emails, in various implementations, action manager 366G generates notifications to a user about sent emails, or emails that the user has previously sent to at least one recipient. As examples, action manager 366G can base notifications for an email on any combination of determining whether one or more recipients have responded to the email, determining when one or more recipients should respond to the email, and determining when the user should be notified regarding ones or more responses to the email. In some cases, Action manager 366G determines a notification time for the email and provides the notification to the user at or based on the notification time.

It is noted that disclosure herein regarding notifications to a user and determinations related to the notifications should be interpreted as being directed to, when applicable, emails that are both sent and received by the user. Furthermore determinations described with respect to the user that receives a notification about an email, such as those used in order to make the determinations regarding the notification, should be interpreted, when applicable, as being directed to one or more senders of email, and/or receivers of the email, regardless of whether that party is the user.

In order to generate and determine aspects of a notification for an email, action manager 366G can analyze and interpret various data associated with the email. This can include message attributes 388 extracted by attribute extractor 366A, various user interactions, and/or historical data, such as routine-related aspects.

In some respects, attribute extractor 366A analyzes emails, such as emails 382, using text processor 366B, interaction analyzer 366C, and inference engine 366D to extract message attributes, such as message attributes 388. As mentioned above, message attributes of an email, or computer message, are extracted by attribute extractor 366A based on the email, such as information extracted from the email, and/or context surrounding the email, including context surrounding the sending and/or receiving of the email and/or emails associated with the email, such as those belonging to a common email thread or conversation.

Message attributes may be extracted from the text, or message body of the email, such as portions of the email drafted by a user. Message attributes may in addition or instead be inferred based on user interactions and/or extracted text from emails. In some cases, at least some message attributes are extracted from the email or an email associated with the email using structured, semi-structured, and structured information extraction to identify the message attributes from the text of the email or an associated email. Further, at least some message attributes for an email may be based on at least one message attribute of at least one associated email. For example, attribute extractor 366A may identify or infer that the text of the email refers to at least one other email. Based on detecting the reference to another email, attribute extractor 366A can utilize one or more message attributes of the other email or other extract a message attribute for the email based on the message attribute of the other email.

Examples of message attributes that can be extracted by attribute extractor 366A include a length of the message body (e.g., the text thereof), number of attachments, specified senders of the email, specified receivers of the email, whether the email is part of a thread, related emails, agenda item attributes, and timing attributes. An agenda item attribute corresponds to a task to be completed by a user based on an email. A timing attribute corresponds to a timing assigned to an agenda item or agenda items associated with an email.

Examples of agenda items or tasks represented by agenda item attributes include for a user to respond to the email, for a user to respond to the email with designated content attached and/or included in the message body of an email or other computer message, for the user to respond to another designated user, for the user to forward the email, for the user to text or call a user, or any suitable combination thereof. A user assigned to a task can be any user involved in an email exchange or a user associated with one of those users. Thus, the user assigned to a task could be the user that receives the notification or a different user. In some cases, multiple agenda items are extracted from a single email. Any user may be assigned to any of the various actions items. In extracting an agenda item, attribute extractor 366A may also extract or determine the user or users assigned to the agenda item. In some cases, one or more users may be assigned to or associated with the agenda item by default, such as the sender or receiver of the email.

Furthermore, for a task for a user that is with respect to another user, the other user can be specified in the agenda item as one or more particular users, types of users, or as any user. In some cases, the other user may be implicit from the type of agenda item assigned to the message attribute. For example, certain agenda items may by definition be with respect to a type of user. Examples of types of users include a sender of the email, a recipient of the email, a boss, assistance, manager, or user having some other particular relationship to a user. In some cases, a relationship to a user can be extracted from a relationship chart that includes the user or that the user can be mapped to. As an example, storage 380 can include an organizational chart that includes or can be used to identify relationships between users. The organizational chart can be user defined and/or inferred from emails between users.

In some approaches, attribute extractor 366A determining agenda items of agenda item attributes comprises mapping the email to one or more agenda item templates. Attribute extractor 366A can determine whether the email corresponds to one or more of the agenda item templates based on an analysis of the email or other information associated with the email. For example, attribute extractor 366A can determine whether one or more of the agenda items apply to the email based on an analysis of the text of the email by leveraging text processor 366B. A template for an agenda item can include one or more completion criteria.

As used herein, completion criteria correspond to criteria utilized to determine whether an agenda item is completed, or satisfied. Action manager 366G can refrain from providing a notification for an agenda item and/or email based on determining that all of the completion criteria are satisfied. As another example, a message of a notification can indicate which of the completion criteria are satisfied and/or not satisfied when not of the completion criteria has been satisfied. As a further example, the action selected by action manager 366G can be based on completion criteria in the subset of the completion criteria that has not yet been satisfied.

Action manager 366G can determine whether completion criteria has been satisfied by analyzing sent and/or received emails of the user, including the text, attachments, subject, or any other features thereof. In some cases, message attributes are extracted from these emails and analyzed with respect to the completion criteria to determine whether any of the completion criteria is satisfied. The message attributes can be extracted similar to other message attributes described herein, and can comprise similar information. It is not that action manager 366G may also analyzer sent and/or received messages of the user other than emails. For example, action manager 366G may analyze computer messages on different messaging platforms, such as instant messages, phone calls, social network messages, and the like to determine whether one or more completion criteria has been satisfied. Thus, a user may respond to an email over instant message and action manager 366G refrains from generating and/or providing a notification of the email based on identifying the response.

Attribute extractor 366A can map text in the email and/or an associated email to parameters of agenda item templates (after determining an agenda item template applies or as part of the determination). Parameters of an agenda item can correspond to variable information used by action manager 366G to determine whether the action has been completed or satisfied (e.g., whether completion criteria of the agenda item is satisfied). In some cases, completion criteria include one or more of the parameters. For example, a completion criteria of the user sending an email to a particular party may use the particular party as a parameter. A message attribute, such as the sender of the email may be mapped to the parameter of the completion criteria.

Parameters of an agenda item can include the users or types of users the task is with respect to (e.g., which specified performing user or users is the party that completes or performs the task and in some cases, which specified non-performing user or users are part of the task such as a recipient of information).

Other examples of parameters of an agenda item include content types or categories that are part of the task. A content type can correspond to a particular type of document, such as a spreadsheet, word processing document, image file, web page, or other document type. In some cases, a content type may correspond to a particular file extension or set of file extensions. A content type can also correspond to topical content of content, such as whether the content covers sports, weather, the news, work, a report or project, finances, scheduling, an event, and the like.

In determining whether a content type of an agenda item is satisfied, action manager 366G can, for example, analyze attachments to emails, such as filenames, file extensions, and/or content contained therein. Action manager 366G can also analyze the text portion of drafted emails.

Examples of timing attributes include a deadline, due date, a time frame, a time line, or other temporal or timing information for performance of one or more particular agenda items. In some cases, one or more agenda items have default or preconfigured timing attributes that are used when the agenda item is assigned to the email. For example, these timings may be defined for an agenda item relative to other message attributes (e.g., temporal attributes), such as relative to the send date of the email, the receive date of the email, the date the email was received, opened, or read the date the email was first or last received, opened, or read, the forwarding date of the email, and more.

In some cases, using text processor 366B, for example, attribute extractor 366A extracts at least one timing attribute of at least one agenda item from an email. This can include a deadline to respond to the email, a due date for a response to the email, or a time frame for a response to the email. The temporal information may be specified by the drafter of the email, either explicitly or implicitly. For example, attribute extractor 366A can infer or interpret the message attributes based on the natural language processing of the text. As one example, the text of the email could include relative language such as "Send me this report next Tuesday," and the timing attribute can be set to the following Tuesday from when the message was sent as specified in the message attributes.

As another example, the text could include "Send me this report after you send me the other report." In this case, attribute extractor 366A may have knowledge of the other report from another email or other tracked interactions between the sender and receiver of the current email. Furthermore, attribute extractor 366A may set the temporal attribute as a time that is relative to completion of another detectable action by action manager 366G. The timing attribute may then be based on action manager 366G determining the completion criteria of the related agenda item or action is complete. As a further example, the text could include "Send me this report with the other report I sent you." In this case, an email regarding sending the other report may specify the timing with the email as a timing attribute of an agenda item corresponding to the sending the other report. Attribute extractor 366A could infer that the temporal attribute associated with the other email also be applied to the current email and assigned that message attribute accordingly. Further, the completion criteria of the current email may include that the user provide the other report (e.g., incorporate completion criteria from the other agenda item or merge the agenda items).

The amount of time used as a timing attribute of an agenda item can be machine learned, such as using routine model engine 240. For example, inference engine 366D can learn timings based on when the user typically performs or completes the task associated with the agenda item and/or prefers to perform or complete the task associated with the agenda item. Thus, for example, inference engine 366D can learn that the user typically responds to emails on Monday mornings and use the time frame or a time derived therefrom as the timing attribute for the agenda item.

As mentioned above, action manager 366G can determine a notification time, such as time 399A for a notification. Determining a notification time can comprising determining whether to present, display, and/or perform some action with respect to a generated notification. Determining a notification time can also include determining or calculating a particular time to display or present a notification. The notification time is used to determine when the notification will be presented to a user. For example, action router 366H can use the notification time to determine when the notification should be sent to the user, or a user device associated with the user. As an example, the notification time can correspond to a time to send out a computer message comprising the notification to a user account associated with a particular user, and can be an email, mobile operating system, or text message. As another example, presentation component 398 can present the notification to a user at or based on the notification time. For example, the notification time may be sent to a user device any time after being generated and be displayed at or based on the notification time. In some cases, the notification time is determined on the user device, for example, where one or more portions of email analyzer 366 are incorporated into the user device.

Action manager 366G can determine the notification time based on one or more timing attributes of one or more agenda items of one or more emails. For example, where a timing attribute of an agenda item is a deadline, action manager 366G can calculate the notification time based on the deadline. This can include calculating the notification time to be a predetermined about of time before the deadline.

Where multiple agenda items have been detected for an email, the notification time may be based on the earliest of the notification times and the message of the notification may concern each notification. As another example, action manager 366G can generate multiple notifications for a single email. Each notification can correspond to one or more of the agenda items. Thus, each agenda item could have a corresponding notification and notification time based on the timing attribute of the notification. Furthermore, action manager 366G could group one or more agenda items together based on parameters or features between the agenda items.

It is further contemplated that a single notification could correspond to multiple emails. For example, action manager 366G could identify agenda items from multiple emails based on the parameters or features of the agenda items. As an example, in some implementations, action manager 366G groups agenda items together for a notification based on identifying at least one corresponding message attribute of the agenda items and/or emails corresponding to the agenda items. For example, agenda items could be grouped together based on having a common sender, recipient, and/or any of the various message attributes described herein.

In some cases, the grouping is based on the timing attributes and/or notification times assigned to the agenda items, such as based on identifying a proximity between the timing attributes and/or notification times of the agenda items. Agenda items that each have timing attributes or notification times within thirty minutes of each other or some other designated time frame could be grouped together. The notification may identify each email corresponding to the notification. By grouping agenda items together, the number of notifications needed for the agenda items is reduced. Grouping agenda items reduces bandwidth and power needed to transmit notifications, processing in generating notifications, and efficiency of the user in that the user has fewer notifications to manage and/or view.

Timing attributes of agenda items can be used as notification times, or notification times can be calculated or determined from timing attributes. In some cases, notification times are machine learned, such as using routine model engine 240. For example, inference engine 366D can learn timings based on historical notifications sent or provided to the user. For example, using feedback analyzer 366F, inference engine 366D can compare a time of a notification of an agenda item with when the user actually performed or completed the task corresponding to the agenda item. Feedback analyzer 366F can update the machine learning model based on the difference between the timings. Using this approach, action manager 366G can present notifications at times that the user is more likely to respond to the notifications. For example, inference engine 366D may learn that the user is more likely to respond to a notification presented thirty minutes before a due date then an hour before the due date. As another example, inference engine 366D may infer that the user is likely to respond to notifications in the evening.

In some cases, feedback analyzer 366F maintains a distribution (e.g., sine or probability distribution) based on time stamps of events of a routine of the user, where the event correspond to historical notifications of emails. Sensitivity analysis can be applied to the time stamps to determine a notification time where the user is at least more likely than not to respond to a notification. In some cases, a notification time may be generated to be earlier or later than an optimal time calculated from historical data to facilitate tuning of the sensitivity analysis.

Action manager 366G can determine timing attributes, notification times, actions, and/or messages of notifications for emails based on identifying and/or determining user context of a user. As another example, action manager 366G can determine priorities of notifications and/or emails with respect to one another to select from which subset to surface, and/or rankings of surfaced emails and/or notifications.

User context can be determined based on currently-sensed interaction data and historically-sensed interaction data, such as using and inference engine 366D and/or interaction analyzer 366C (e.g., whether to present a notification or a particular time to present a notification). User context can comprise one or more activities inference engine 366D determines the user is currently engaged in or will be engaged in. Thus, action manager 366G can determine a notification time for a notification based on inference engine 366D determining the user is or will be engaged in one or more predefined activities.

In some cases, activities are determined independently of routines tracked for the user. For example, where user interactions indicate the user has loaded an email application and looked through multiple emails, inference engine 366D can infer the user is reading emails. In other cases, activities are part of routines, such as routine-related aspects or events of one or more routines and inference engine 366D determines that the user is currently engaged in or will be engaged in the activity based on the routine-related aspects and/or user interactions which may indicate the user is or will participate in the activities. For example, the user may have a tracked routine of checking emails every afternoon. Based on the user loading an email application, the tracked routine, and the time associated with the routine, inference engine 366D can infer that the user will be reading emails as part of the routine.

As a further example, based on routine-related aspects of the routine, inference engine 366D may identify that the user typically practices the routine of responding to emails early in the morning at work. Based on the identification, the notification time for one or more notifications may be generated, for example, to be within the time frame indicated by the interaction dataset of the routine that the user typically practices the routine. As another example, inference engine 366D can determine that the user typically drives to work between 7:00 AM and 8:00 AM and refrain from presenting the notification during that time frame based on the determination.

In some implementations, timing attributes and/or notification times are based on determining whether the user has opened and/or read the email regarding the notification(s). In some cases, action manager 366G determines that the user has read and/or opened the email. This can include, for example, identifying metadata assigned to the email that indicates the user has opened the email. As another example, action manager 366G can determine that the user has not read the email even where the email has been opened based on user context determined by action manager 366G. These determination may be based on determining and/or identify user context regarding (e.g., during) the opening and/or reading of the email. For example, action manager 366G can analyze user interaction data using interaction analyzer 366C to determine whether the user read the email.

Factors that the determination can be based on include scroll time of a window comprising a message of the email, time spent with the email opened, a number of times the user opened the email, whether the user opened and/or viewed one or more attachments, and the like. Other factors include which device type, or particular device the user was using to open or view the email, such as whether the device is a mobile device, a phone, a laptop, or other type of device specified with respect to user device 102a, or which account type, or particular account the user was logged into when interacting with the email.

Further factors include determining and/or identifying any of various email characteristics, such as particular message attributes and/or predetermined message attribute types, whether the email includes an attachment(s), a type of attachment(s), a length of the text in the message of the email, and the like, a type of content included in an attachment and/or message of the email, and the like.

Additional factors correspond to whether the user is engaged in or will be engaged in at least one routine that is models by one or more user routine models. For example, if inference engine 366D determines the user is driving to work, the user is likely not focused on reading the emails. Therefore, the notification time may be based on that determination. The activity of the user (e.g., driving to work, the user attempting to delete an email that includes an agenda item that does not have its completion criteria satisfied) can be determined based on the routine and the notification time of the email may be based on the activity derived from the routine. In other cases, the activity is determined independently from user routine models (e.g., by analyzing user interaction data). Further factors include whether the user has printed the attachments of the email, spent greater than a threshold amount of time viewing the email, or other factors indicating whether the user is focused on the email.

Using the forgoing factors and determinations, for example, action manager 366G can determine that an email still requires action, even after having been opened. For example, the user may have opened the email on a mobile device while driving. An agenda item extracted from the email may correspond to the user signing documents attached to the email. Based on determining that the user has not opened the attachment and viewed the email while driving, action manager 366G can determine that a notification should be provided to the user. As another example, from historical observations and routines of the user, inference engine 366D can determine that the user is unable to complete the agenda item on the mobile device and/or at a certain location. For example, the user may need to use a work computer to print documents for signature.

Timing attributes, notification times, actions, and/or messages of notifications can also be based on historical response patterns to agenda items and/or emails based on email context. For example, inference engine 366D can learn that the user typically responds quickly or requires responses quickly for emails with specific senders or receivers such as emails from a boss, a family member, a co-worker, an assistance or other type of user or specific user. Therefore, notification for emails involving these parties may have shorter notification times than other emails. For example, action manager 366G can generate a time for a notification based on a timing attribute of an agenda item, such as a due date, by factoring in the email context. This email context can be from the message attributes of the email. For example, action manager 366G can utilize at least one message attribute of emails to learn at least one routine-related weight for at least one routine-related feature by analyzing interaction datasets 233 used to train user routine models 235. To generate a notification time for a particular email, the routine-related features can be extracted from the message attributes and applied to one or more user routine models.

Referring now to FIG. 4, FIG. 4 depicts a flow diagram of method 400 for notifying users of emails, in accordance with implementations of the invention. At block 410, method 400 includes extracting message attributes from an email associated with a user. For example, email analyzer 366 can extract message attributes 388 from email 378 based on the user having sent or received the email.

At block 420, method 400 includes determining whether the user has opened the email. For example, action manager 366G can determine whether the user opened email 378. The determination can utilize inference engine 366D to infer that the user opened the email based on user interaction data and/or routine-related aspects of the user. In addition or instead, the determination can be based on identifying metadata of email 378, which marks the email as being opened.

At block 430, method 400 includes determining user context of the user opening the email based on routine-related aspects. For example, action manager 366G can determine the user context using inference engine 366D. The user context can be determined based on user interaction data from user interactions analyzed by interaction analyzer 366C. The user interaction data can be associated with the display of the email to the user and/or the opening of the email. In some cases, time stamps corresponding to the user interactions are utilized to associate the user interactions with the opening of the email.

At block 440, method 400 includes determining a notification time of a notification of the email based on the user context and the message attributes. For example, action manager 366G can determine whether to display or present notification 399 to the user and/or time 399A to display or present the notification to the user based on the user content and message attributes 388. Action manager 366G can also select and/or generate message 399B based on similar information.

At block 450, method 400 includes providing the notification to the user. For example, action manager 366G can send or transmit the notification to presentation component 398 based on the notification time. As another example, presentation component 398 can display notification 399 to the user on a user device based on the notification time.

Referring now to FIG. 5, FIG. 5 depicts a flow diagram of method 500 for notifying users of emails, in accordance with implementations of the invention. At block 510, method 500 includes extracting an agenda item from an email associated with a user. For example, email analyzer 366 can extract an agenda item from email 378 using attribute extractor 366A.

At block 520, method 500 includes identifying user interaction data associated with display of the email. For example, action manager 366G can identify user interaction data associated with display of the email. The identification could include inference engine 366D inferring that the user interaction data corresponds to the display of the email, for example, based on one or more routine-related aspects of a routine of the user.

At block 530, method 500 includes identifying user interaction data associated with display of the email. For example, action manager 366G can determine user interaction data from interaction analyzer 366C corresponds to one or more routines represented by one or more of user routine models 235.

At block 540, method 500 includes determining a time to present a notification of the email based on the routine. For example, action manager 366G can generate one or more features of one or more machine learning models based on the routine and determine the routine corresponds to the user interaction data. Inference engine 366D can utilize the features to determine time 399A for notification 399, the contents of message 399B, and/or other machine learned variables.

At block 550, method 500 includes providing the notification to the user. For example, action manager 366G and/or presentation component 398 can provide notification 399 for display to the user based on time 399A.

Figure 6:
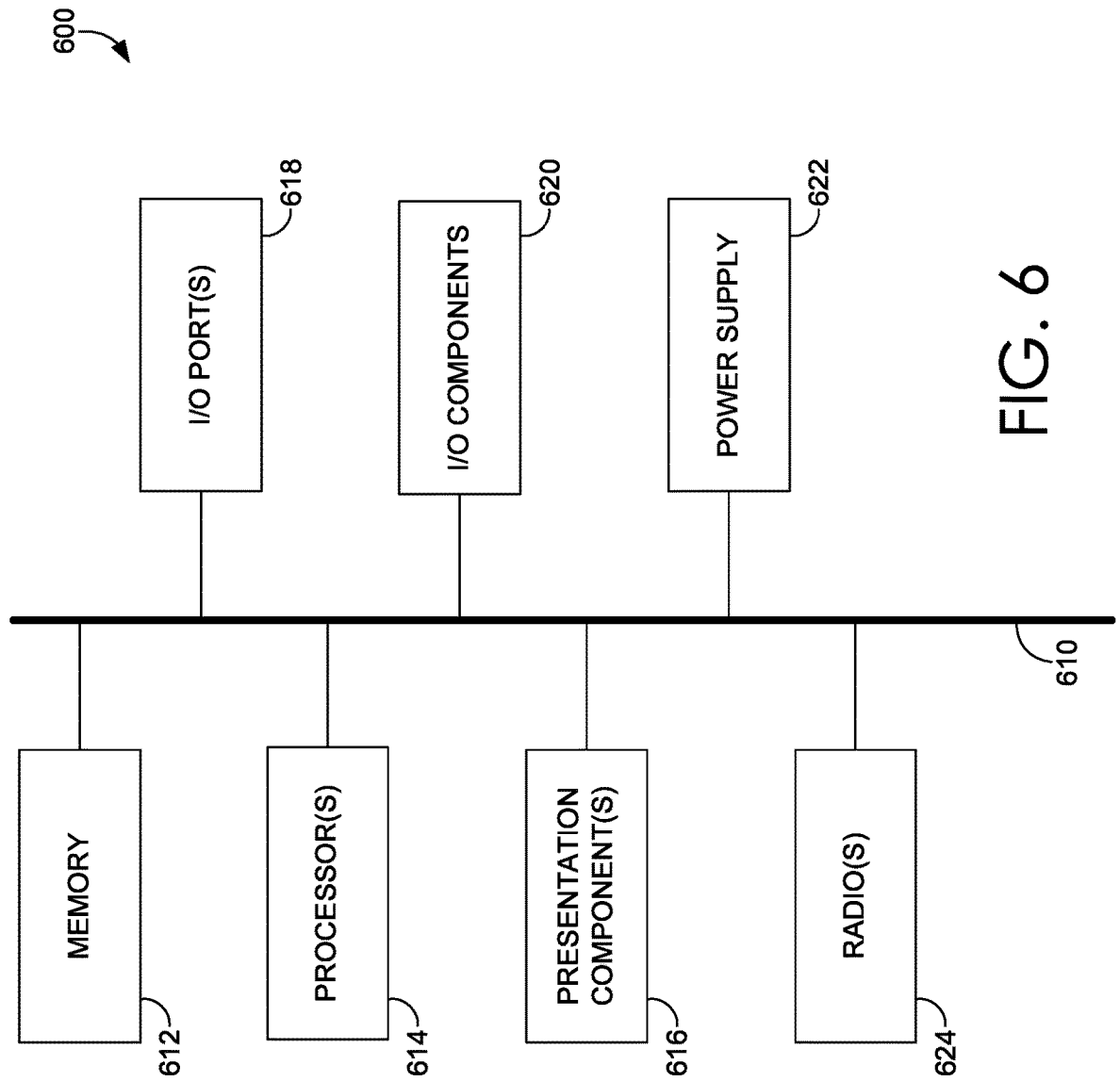
FIG. 6 is a block diagram of an exemplary computing environment suitable for use in implementing implementations of the invention.

Having described various implementations of the invention, an exemplary computing environment suitable for implementing implementations of the invention is now described. With reference to FIG. 6, an exemplary computing device is provided and referred to generally as computing device FIG. 6. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

Implementations of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Implementations of the invention may be practiced in a variety of system configurations, including handheld devices, consumer electronics, general-purpose computers, more specialty computing devices, etc. Implementations of the invention may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes bus 610 that directly or indirectly couples the following devices: memory 612, one or more processors 614, one or more presentation components 616, one or more input/output (I/O) ports 618, one or more I/O components 620, and illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more implementations of the present invention. Distinction is not made between such categories as "workstation," "server,"

"laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

I/O ports 618 allow computing device 600 to be logically coupled to other devices, including I/O components 620, some of which may be built in. Illustrative components include a microphone, joystick, game pad, satellite dish, scanner, printer, wireless device, etc. I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 600. Computing device 600 may be equipped with depth cameras, such as stereoscopic camera systems, infrared camera systems, RGB camera systems, and combinations of these, for gesture detection and recognition. Additionally, computing device 600 may be equipped with accelerometers or gyroscopes that enable detection of motion. The output of the accelerometers or gyroscopes may be provided to the display of computing device 600 to render immersive augmented reality or virtual reality.

Some implementations of computing device 600 may include one or more radio(s) 624 (or similar wireless communication components). Radio 624 transmits and receives radio or wireless communications. Computing device 600 may be a wireless terminal adapted to receive communications and media over various wireless networks. As such, computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Implementations of the present invention have been described with the intent to be illustrative rather than restrictive. Alternative implementations will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:
1. A computerized system comprising:
one or more processors; and
one or more computer storage media storing computer-useable instructions that, when executed by the one or more processors, cause the one or more processors to perform operations comprising:
extracting message attributes of an email associated with a user from the email;
based on a display of at least some content of the email, identifying user interaction data generated by the user in association with the display of the at least some content of the email;
determining the user interaction data was generated during a routine of the user based on a routine-related aspect generated from a user routine model representing the routine;
based on the determining the user interaction data was generated during the routine, determining a time to present a notification of the email; and analyzing additional user interactions by the user with the email after determining the time to present the notification;
updating the time present the notification based on the additional user interactions;
based on determining the updated time to present the notification, providing the notification at the updated time, wherein the notification is provided on a user device to remind the user of the email associated with user interaction data that was generated during the routine.

2. The computerized system of claim 1, wherein the determining the user interaction data corresponds to the routine of the user comprises determining the user is engaged in the routine.

3. The computerized system of claim 1, wherein the determining the time to present the notification of the email comprises determining the user will be engaged in the routine during the time to present the notification.

4. The computerized system of claim 1, wherein determining the time to present the notification of the email is based on the routine and the message attributes.

5. The computerized system of claim 1, wherein the operations further comprise determining the user interaction represents the user opening the email.

6. The computerized system of claim 1, wherein the operations further comprise determining the user opened the email based on the email being marked as opened by the user interactions, and the email is no longer marked as opened during the determining of the notification time and the providing the notification to the user.

7. The computerized system of claim 1, wherein the notification comprises a first reminder of the email, and a second reminder of an additional email based on an additional message attributes extracted from the additional email.

8. The computerized system of claim 1, wherein the determining the user interaction data corresponds to the routine of the user is based on determining an amount of time the user viewed the email.

9. The computerized system of claim 1, wherein the determining the user interaction data corresponds to the routine of the user comprises comparing the routine-related aspect to at least one message attribute extracted from the email.

10. The computerized system of claim 1, wherein the routine corresponds to the user reading emails.

11. The computerized system of claim 1, wherein the determining the time to present the notification comprises:
determining that the notification should be presented to the user based on the message attributes;
extracting a location from the routine as the routine-related aspect; and determining that the location corresponds to a current location of the user.

12. A computerized method comprising:
extracting message attributes from an email associated with a user;
determining an opening of the email by the user, the opening displaying content of the email;
determining user context of the opening of the email based on routine- related aspects generated from one or more user routine models associated with the user;
based on the opening of the email, determining a notification time of a notification for the email;
analyzing the additional user interactions by the user with the email after determining the notification time to present the notification for the email;
updating the notification time of notification for the email based on the additional user interactions; and
providing the notification for the email to the user based on the determining of the updated notification time.

13. The computerized method of claim 12, wherein the opening of the email by the user marks the email as opened and the email remains marked as opened from the opening during the determining of the notification time and the providing the notification to the user.

14. The computerized method of claim 12, wherein determining the user context comprises analyzing interaction data generated by the user in association with display of the email based on sensor data from one or more sensors.

15. The computerized method of claim 12, further comprising determining a notification time of a notification for the email based on the user context and the message attributes, wherein the notification operates as a reminder.

16. The computerized method of claim 12, wherein the determining the user context of the user opening the email comprises determining the user is engaged in a routine represented by one of the one or more user routine models.

17. The computerized method of claim 12, wherein the determining the notification time of the notification of the email comprises determining the user will be engaged in routine represented by one of the one or more user routine models during a time the notification is presented.

18. One or more computer storage devices storing computer-useable instructions that, when executed by the one or more computing devices, cause the one or more computing devices to perform a method comprising:
extracting message attributes from an email associated with a user;
determining user context of an opening of the email by the user based on routine-related aspects generated from one or more user routine models associated with the user, the opening displaying content of the email;
based on the opening of the email, determining a notification time of a notification for the email;
analyzing the additional user interactions by the user with the email after determining the notification time to present the notification for the email;
updating the notification time of notification for the email based on the additional user interactions; and
providing the notification for the email to the user based on the determining of the notification time, wherein at least some of the content of the email was displayed during the one or more routine models.

19. The one or more computer storage devices of claim 18, wherein the determining the user context of the user opening the email comprises determining the user is engaged in a routine represented by one of the one or more user routine models.

20. The one or more computer storage devices of claim 18, wherein the determining the notification time of the notification of the email comprises determining the user will be engaged in routine represented by one of the one or more user routine models during a time the notification is presented.

* * * * *